(12) United States Patent
Chignoli et al.

(10) Patent No.: US 6,322,090 B1
(45) Date of Patent: Nov. 27, 2001

(54) SUSPENSION SYSTEM WITH AN OSCILLATING, RIGID AXLE, PARTICULARLY FOR TRACTORS

(75) Inventors: Carlo Chignoli; Santino Pirotta, both of Vaprio D'Adda; Paolo Scirea, Cinisello Balsamo, all of (IT)

(73) Assignee: Carraro S.p.A., Campodarsego (IT)

( * ) Notice: Subject to any disclaimer, the term of this patent is extended or adjusted under 35 U.S.C. 154(b) by 0 days.

(21) Appl. No.: 09/417,753

(22) Filed: Oct. 14, 1999

(30) Foreign Application Priority Data

Oct. 15, 1998 (IT) .............................................. PD98A0242

(51) Int. Cl.⁷ ...................................................... B60G 9/04
(52) U.S. Cl. .................................... 280/124.157; 280/5.5; 280/6.157; 280/124.16; 280/124.116; 280/86.5; 280/763.1; 280/764.1; 180/209
(58) Field of Search ............................... 280/6.15, 6.513, 280/124.11, 86.75, 124.139, 676, 683, 685, 42.33, 124.157; 105/218.2; 239/567; 298/22; 14/71.3

(56) References Cited

U.S. PATENT DOCUMENTS

| | | | |
|---|---|---|---|
| 3,620,458 | * 11/1971 | Rath | 239/657 |
| 3,791,695 | * 2/1974 | Seniuk | 298/22 J |
| 3,809,429 | * 5/1974 | Channell | 298/17 S |
| 3,952,826 | * 4/1976 | Barker et al. | 180/136 |
| 4,092,012 | * 5/1978 | Ishigami | 254/126 |
| 4,168,861 | * 9/1979 | Carroll | 298/22 J |
| 5,074,580 | * 12/1991 | Wagner et al. | 280/679 |
| 5,784,740 | * 7/1998 | DiSieno et al. | 14/71.3 |
| 5,931,486 | * 8/1999 | Andreis | 280/124.139 |
| 6,012,706 | * 1/2000 | Gill | 254/122 |
| 6,098,551 | * 8/2000 | Kern | 105/218.2 |

* cited by examiner

Primary Examiner—Lanna Mai
Assistant Examiner—Paul Royal, Jr.
(74) Attorney, Agent, or Firm—Sughrue, Mion, Zinn, Macpeak & Seas, PLLC

(57) ABSTRACT

A suspension system with an oscillating, rigid axle, particularly for tractors, is described; the axle is supported on a sub-frame with oscillating arms which in turn can be mounted for oscillating on a load-bearing structure of the tractor by suspension means interposed between the axle and the load-bearing structure, the sub-frame comprising at least two pairs of arms arranged so as to form a so-called pantograph-like kinematic linkage.

4 Claims, 4 Drawing Sheets

SUSPENSION SYSTEM WITH AN OSCILLATING, RIGID AXLE, PARTICULARLY FOR TRACTORS

BACKGROUND OF THE INVENTION

The subject of the present invention is a suspension system with an oscillating, rigid axle, particularly for tractors.

The current tendency to build fast agricultural tractors makes it necessary to provide suspension systems, particularly for the front axles, which ensure the stability of the vehicle together with adequate comfort even when travelling at the relatively fast speeds which are developed nowadays.

There are currently many suspension systems available on the market. A typical example, in the field of which the present invention also lies, is that of systems with oscillating, rigid axles supported by the load-bearing structure of the tractor by means of a sub-frame.

The sub-frame normally defines an articulation point about which the axle can move along a substantially vertical path.

A disadvantage encountered with these devices lies in the fact that they require specific provisions of the load-bearing structure—the so-called "carriage" of the tractor—and are unsuitable for fitting on vehicles which do not have such provision, that is, which are arranged for receiving either conventional oscillating axles or axles provided with suspension.

Another disadvantage lies in the fact that current structural configurations of the sub-frame, particularly with regard to the positioning of the articulation point, define a path of the axle which is not rectilinear but is generally arcuate about the articulation point. This leads to variations in the wheel base or spacing between the axles of the tractor and/or to movements of the axle transverse its vertical axis, which may adversely affect the correct behaviour of the vehicle in motion.

SUMMARY OF THE INVENTION

The main aim of the present invention is to provide a suspension system which is devised particularly but not exclusively for agricultural tractors and which is designed structurally and functionally so as to prevent all of the disadvantages complained of with reference to the prior art mentioned.

A further object of the invention is to provide a suspension system which can be fitted on tractors without requiring substantial structural modification thereof.

Another object of the invention is to render the suspension system optionally adaptable to agricultural tractors to replace conventional oscillating rigid axles.

This aim and these objects are achieved by the invention by means of a suspension system including the characteristics illustrated in the following claims.

BRIEF DESCRIPTION OF THE DRAWINGS

The characteristics and the advantages of the invention will become clearer from the detailed description of a preferred embodiment thereof, described by way of non-limiting example with reference to the appended drawings, in which.

DETAILED DESCRIPTION OF THE INVENTION

Figure 1:
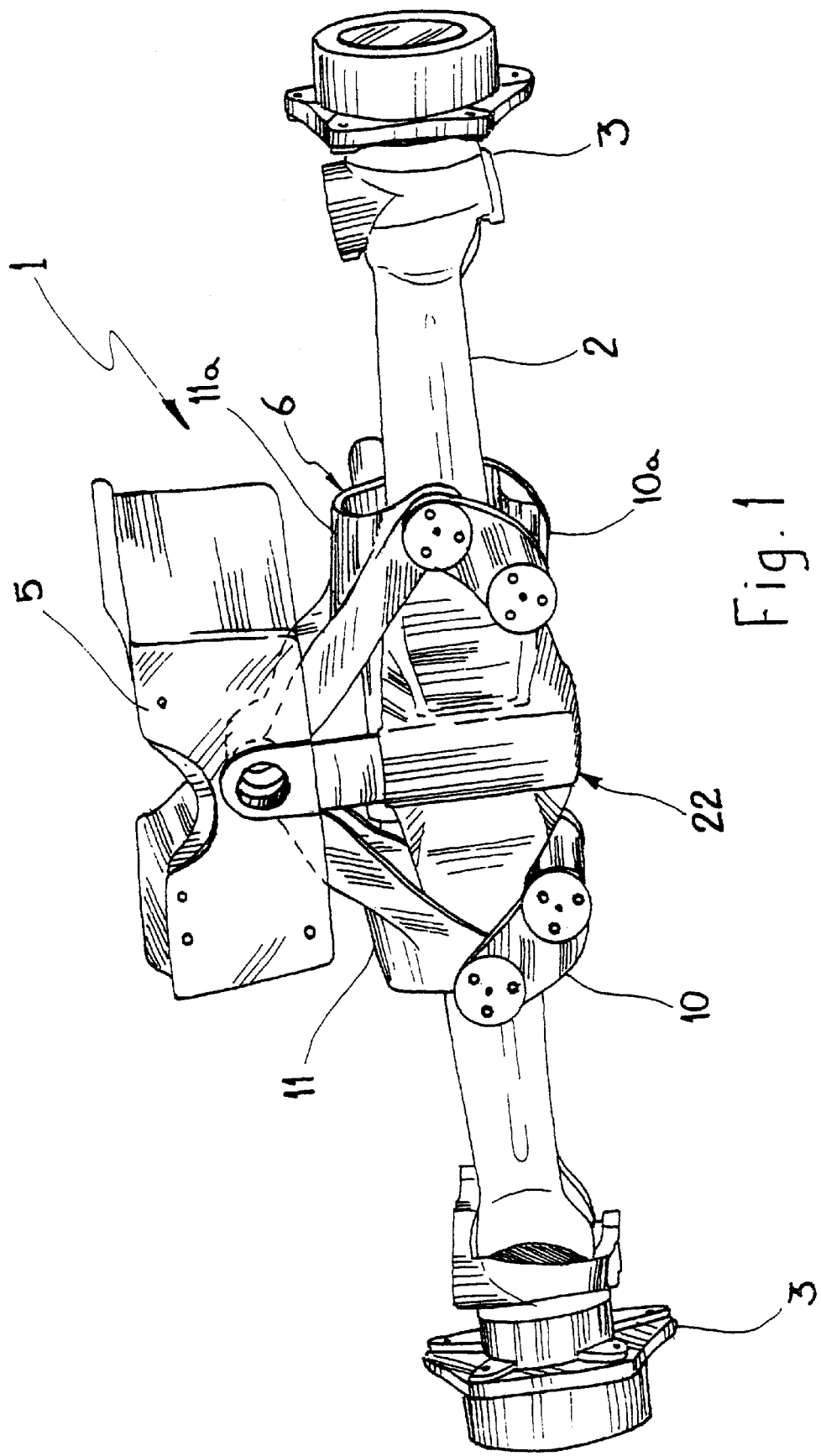
FIGS. 1 and 2 are front perspective views of the suspension system of the invention at two different operative stages.

In the drawings, a suspension system, generally indicated 1, includes a rigid axle 2 having a predominant longitudinal dimension and having, at its opposite ends, wheel hubs 3 the pivoting of which about respective steering axes is brought about by a steering cylinder 4. The axle may be a driving axle and, in this case, contains transmission members such as a differential, half-shafts, reduction gears and other conventional components.

The axle 2 is in turn mounted on a carriage 5 forming part of the load-bearing structure of an agricultural tractor, by means of a sub-frame, generally indicated 6.

The frame 6 comprises two pairs of first and second arms, the arms of the first pair being indicated 10 and 11, respectively, and the arms of the second pair being indicated 10a and 11a, respectively.

The pair of arms 10, 11 is disposed in a symmetrically opposed arrangement relative to the pair of arms 10a, 11a, in an arrangement typical of the kinematic mechanism known as a scissor jack.

In each of the above-mentioned arms it is possible to identify two connecting-rod-like elements fixed together by respective transverse elements and having, at their opposite ends, through-holes constituting seats for bushes 13 and pins 14.

The holes 15, 15a of respective first ends of the first arms 10, 10a are elements for the articulation of the first arms to the axle by means of the above-mentioned bushes 13 and pins 14 in respective sleeves 16, 16a which are fixed to the lower portion of the axle 2 on either side of the differential housing.

The holes 17, 17a and 18, 18a of respective second ends of the first arms 10, 10a and of respective first ends of the second arms 11, 11a, respectively, are elements for the articulation of the first and second arms to one another by means of the bushes 13 and pins 14.

The holes 19, 19a of respective second ends of the second arms 11, 11a are elements for the articulation of the second arms to one another and to the carriage 5 by means of a pin 20 belonging to the carriage 5.

The second arms are thus articulated at their second ends about a single axis coinciding with the oscillation axis of the axle.

Suspension means constituted by a single, double-acting hydraulic jack, generally indicated 22, are interposed between the axle 2 and the carriage 5. The jack 22 is connected, in known manner, to gas accumulators and/or to other resilient suspension elements to provide the springing and shock-absorbing effect required thereof.

The jack 22 comprises a piston 23 slidable in a cylinder 24 articulated on the pin 20 by an end eye 25 of the cylinder 24 and guided for sliding, by means of its outer cylindrical surface, in a tubular seat 26 of the axle 2. The engagement between the cylinder 24 and the seat 26 constitutes a linear guide by which the axle is restrained and guided along an axis substantially perpendicular to its own longitudinal axis and perpendicular to the axis of the pin 20 during the movement away from and towards the oscillation axis, which coincides with the axis of the pin 20.

Correct operation of the suspension is thus maintained, regardless of the extent of the oscillation of the axle about the axis of the pin 20.

The suspension system of the invention operates as follows. The hydraulic or hydropneumatic jack 22 constitutes a resilient and shock-absorbing member for absorbing the stresses brought about on the axle and for the adjustment of its height above the ground as desired. The jack can be locked, in conventional manner, in order to transform the system 1 into a rigid system with an oscillating axle, should this be required owing to the presence of certain tools associated with the tractor.

Figure 2:
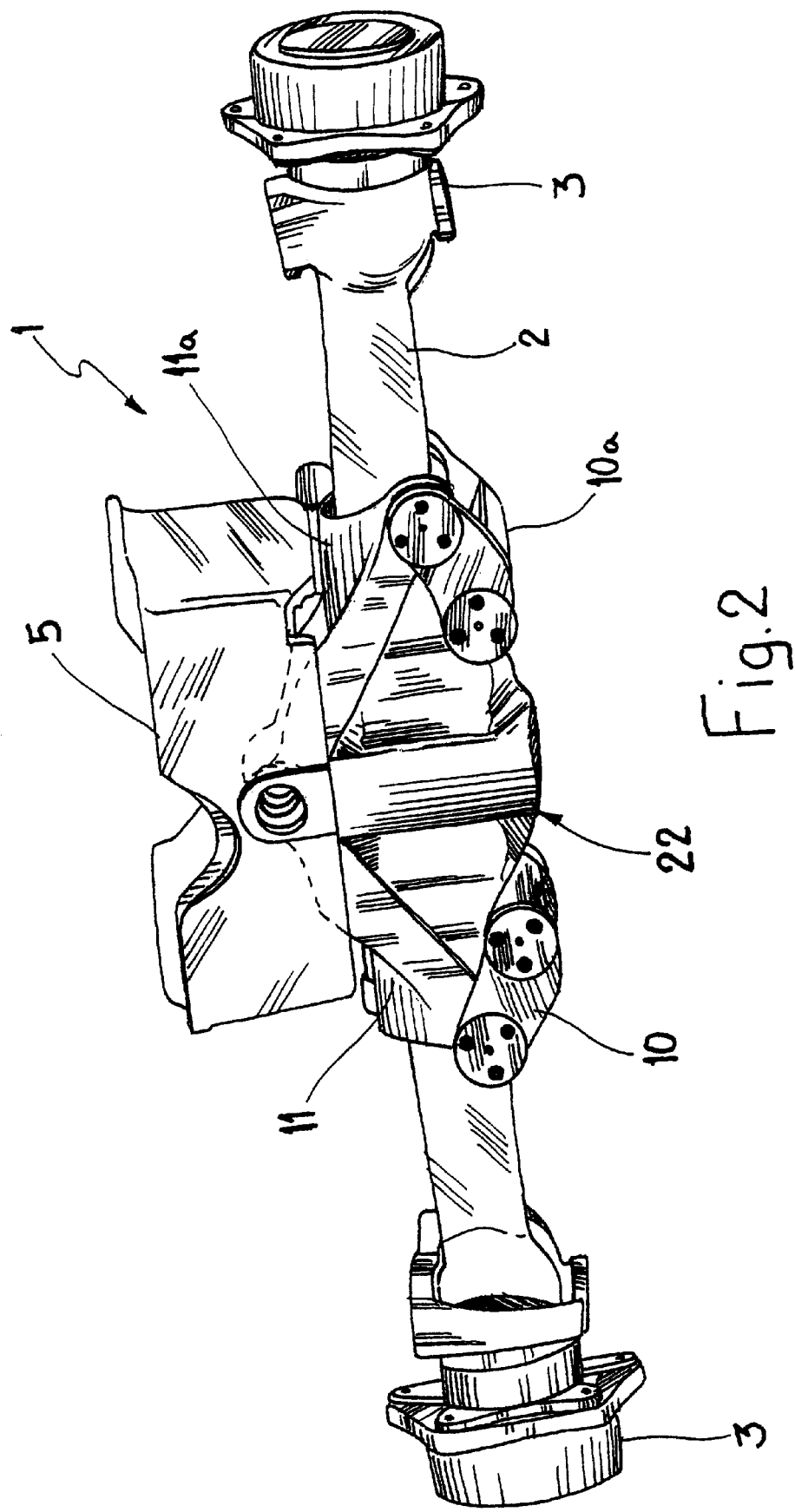
Figure 3:
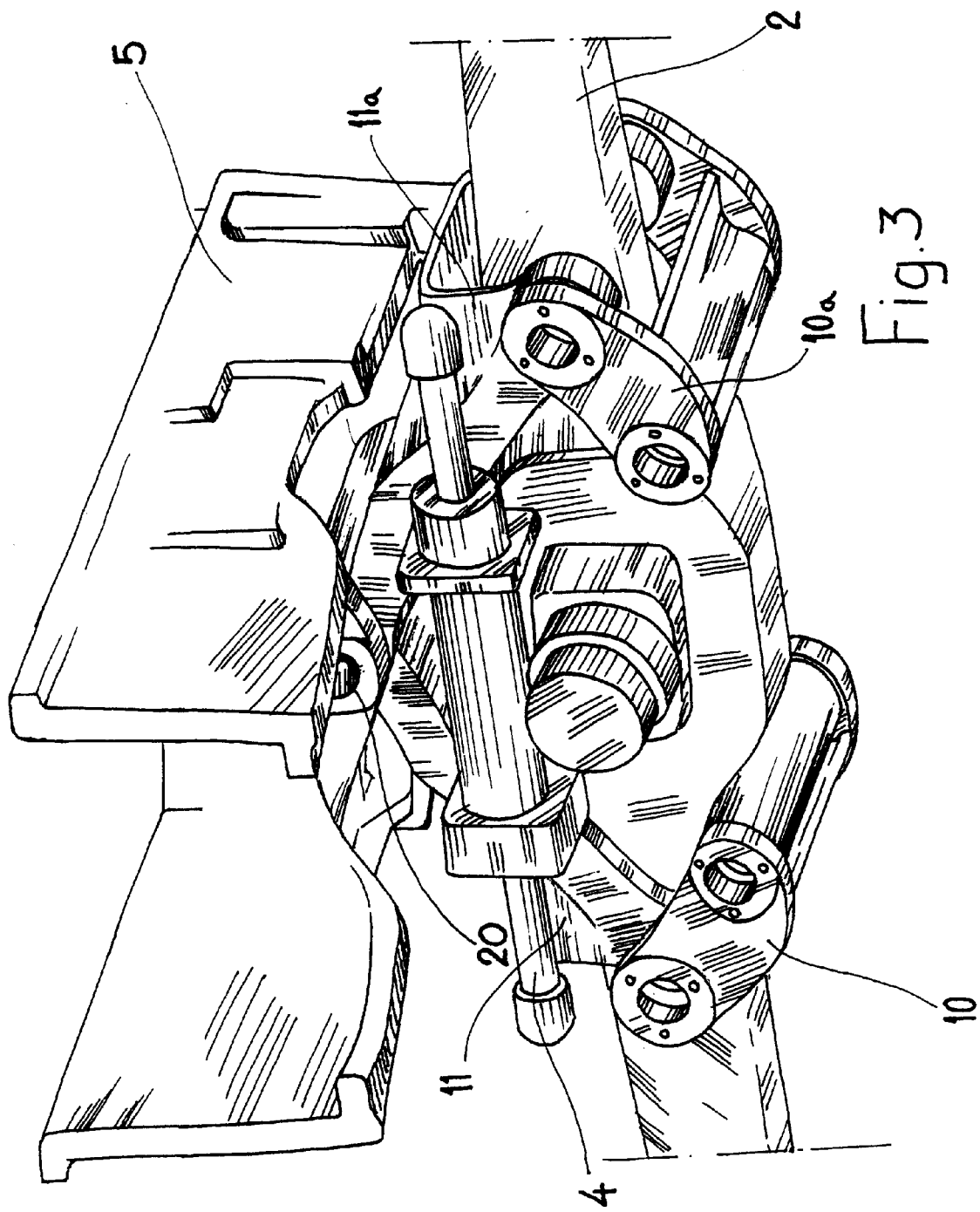
FIG. 3 is a rear perspective view of the suspension system of the preceding drawings.
Figure 4:
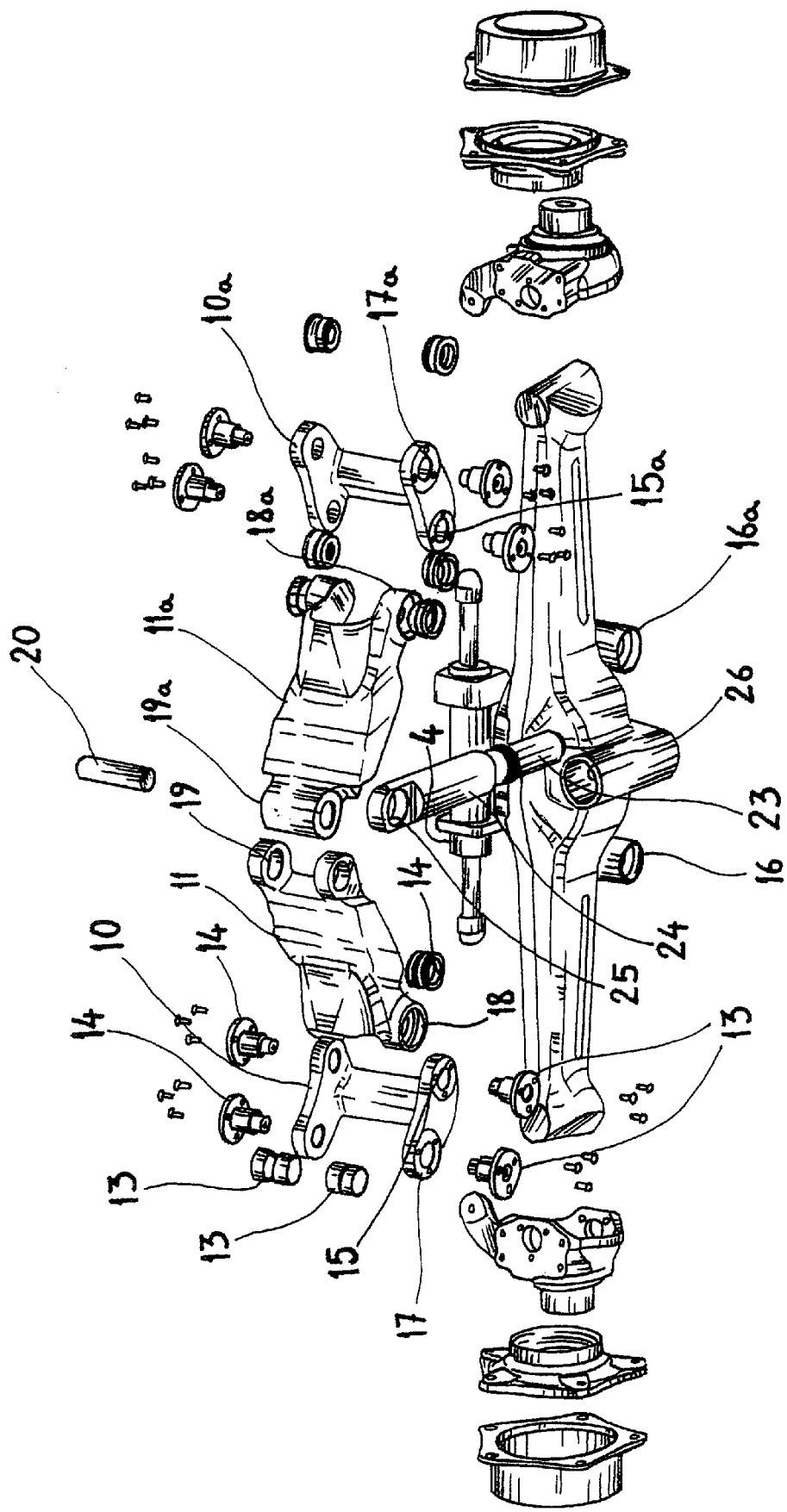
FIG. 4 is an exploded, perspective view of the suspension system of the invention.

The jack 22 also constitutes a guide member for limiting the freedom of the arms 10, 10a, 11, 11a to oscillate. Instead of acting between the axle and the pin 20, the jack is arranged so as to act between corresponding arms or even between the corresponding articulations of the arms of each pair. Under stress, or for a different adjustment of the height of the axle 2 above the ground, the piston of the jack 22 is extended further or is retracted further into the cylinder, moving from the position of FIG. 1 to that of FIG. 2 or vice versa, with every possible intermediate position.

The suspension system of the invention can therefore be fitted on tractors which are arranged for receiving an oscillating axle with suspended mounting; the suspension system can be adapted to tractors of different types, possibly with replacement of the carriage 5.

What is claimed is:

1. A suspension system with an oscillating, rigid axle, for tractors wherein the axle ha longitudinal axis and is supported on a sub-frame having articulated arms which in turn is mounted for oscillation about an axis of oscillation on a load bearing structure adapted to be mounted on the tractor, suspension means for moving the axle toward and away from the load bearing structure being interposed between the axle and the load bearing structure, wherein the sub-frame comprises at least two pairs of first arms and second arms each having opposed first and second ends, the first arms of each pair being articulated to the axle by respective first ends, and to the respective first ends of the second arms by respective second ends, the second arms being articulated to the load bearing structure by their respective second ends, the pairs of arms being arranged so as to form a four sided kinematic linkage, and wherein the suspension means comprise linear guide means for restraining and guiding the axle along an axis substantially perpendicular to said longitudinal axis of the axle during movement of the axle toward and away from said axis of oscillation.

2. A system according to claim 1, in which the second arms are articulated, at their respective second ends, about a single axis coinciding with the axis of oscillation of the axle.

3. A system according to claim 1, in which the suspension means are restrained on the load-bearing structure on the axis of oscillation of the axle.

4. A system according to claim 1, in which the suspension means comprise a hydraulic or hydropneumatic jack with a piston slidable in a cylinder which in turn is slidable in a seat of the axle, the piston, the cylinder and the seat being coaxial with one another, the cylinder and the seat constituting the guide means.

\* \* \* \* \*